United States Patent [19]
Mitchell et al.

[11] Patent Number: 6,077,624
[45] Date of Patent: Jun. 20, 2000

[54] LITHIUM ION CELLS WITH IMPROVED THERMAL STABILITY

[75] Inventors: Porter H. Mitchell, Las Vegas; Jeremy Barker; Tracy E. Kelley, both of Henderson, all of Nev.

[73] Assignee: Valence Technology, Inc., Henderson, Nev.

[21] Appl. No.: 08/911,476

[22] Filed: Aug. 14, 1997

[51] Int. Cl.[7] .................................................. H01M 4/62
[52] U.S. Cl. ........................................... 429/217; 429/212
[58] Field of Search ..................................... 429/217, 218, 429/247, 249, 254; 526/255, 329.4

[56] References Cited

U.S. PATENT DOCUMENTS

| | | |
|---|---|---|
| 3,876,654 | 4/1975 | Pattison . |
| 3,894,118 | 7/1975 | Aronoff et al. . |
| 4,200,568 | 4/1980 | Trautvetter et al. . |
| 4,489,196 | 12/1984 | Schmiegel . |
| 4,496,682 | 1/1985 | Schmiegel . |
| 4,868,234 | 9/1989 | Tabb .................................... 524/236 |
| 5,415,958 | 5/1995 | Takahashi et al. ..................... 429/217 |
| 5,418,091 | 5/1995 | Gozdz et al. . |
| 5,429,891 | 7/1995 | Gozdz .................................... 429/192 |
| 5,456,000 | 10/1995 | Gozdz et al. . |
| 5,460,904 | 10/1995 | Gozdz .................................... 429/192 |
| 5,468,571 | 11/1995 | Fujimoto et al. ....................... 429/217 |
| 5,739,234 | 4/1998 | Kashio et al. .......................... 526/255 |

FOREIGN PATENT DOCUMENTS

| | | |
|---|---|---|
| 0662728A1 | 7/1995 | European Pat. Off. ......... H01M 4/66 |
| 662728 | 7/1995 | European Pat. Off. ......... H01M 4/66 |
| 0662 728 A1 | 12/1995 | European Pat. Off. . |
| 0730 316 A1 | 4/1996 | European Pat. Off. . |

OTHER PUBLICATIONS

W.W. Schmigel, "Crosslinking of Elastomeric Vinylidene Fluoride Copolymers with Nucleophiles," Die Angewandte Makromolekulare Chemie, vol. 76/77, 39–65 (1979) No month.

*Primary Examiner*—Maria Nuzzolillo
*Assistant Examiner*—Mark Ruthkosky
*Attorney, Agent, or Firm*—Young & Basile, P.C.

[57] ABSTRACT

The methods and compositions of the invention provide two solutions to reduce the reactivity of VDF-based copolymers to lithiated graphite. The two approaches can be used separately or combined. In one embodiment, the relative proportion of the VdF and the other fluorinated monomer (OFM, i.e. HFP) in the copolymer is significantly reduced below conventional formulations in order to reduce the reactivity of the copolymer. In a second approach, the reactivity of the copolymer, over a broad range of monomer VdF:OFM molar ratios, is reduced by deactivating the reactive sites on the copolymer, thereby blocking the ability to undergo undesired reaction during cell operation. These methods and compositions have heretofore not been proposed and are of primary importance in preventing large exothermic reaction which can lead to thermal runaway when conventional polymer formulations are utilized in batteries in the presence of reactive components such as lithiated graphite.

21 Claims, 2 Drawing Sheets

6,077,624

LITHIUM ION CELLS WITH IMPROVED THERMAL STABILITY

FIELD OF THE INVENTION

The present invention relates to primary and secondary electrochemical cells, and particularly cells having polymeric electrolyte/separator films, and preferred electrode comprising polymeric binder forming a matrix for retaining active material.

BACKGROUND OF THE INVENTION

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

A typical laminated battery cell structure 10 is depicted in FIG. 1. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

In another embodiment, a multicell battery configuration as per FIG. 2 is prepared with copper current collector 51, negative electrode 53, electrolyte/separator 55, positive electrode 57, and aluminum current collector 59. Tabs 52 and 58 of the current collector elements form respective terminals for the battery structure.

In each of these implementations, cell components are subject to undesirable degradation. The consequence of such degradation is evidenced by evolution of gaseous and acidic materials. Yet, the mechanism of such degradation is not understood, and, therefore, a remedy has not been found.

SUMMARY OF THE INVENTION

The present invention provides a novel composition and method for preventing decomposition and undesirable degradation of cell components, particularly the polymeric binder used in all of the major cell components, positive electrode film, negative electrode film, and electrolyte/separator membrane. In one aspect, the invention provides a method for stabilizing the polymeric film of an electrochemical cell where such film comprises a copolymer of vinylidene fluoride (VdF) and at least one other fluorinated monomer (OFM), by including in said polymeric film a polyhydroxylic aromatic crosslinking agent and heating the cell to a temperature sufficient to cause vulcanization of the copolymer thereby stabilizing the copolymer against degradation during operation of the cell. Preferably the polyhydroxylic aromatic crosslinking agent is a part of the polymeric material and is included as a part of the polymeric binder film. Preferably the copolymer is vulcanized by a mixture comprising the crosslinking agent, an accelerator for the crosslinking agent, and an inorganic base. In the method of the invention, the crosslinking agent is preferably an aromatic dihydroxy compound; the accelerator is a phosphonium salt or an ammonium salt; and the inorganic base is a metal oxide, metal hydroxide, or mixtures thereof. More preferably, the crosslinking agent is a bisphenol; the accelerator is a benzyl triphenyl phosphonium chloride; and the inorganic base is selected from the group consisting of aluminum oxide ($Al_2O_3$), sodium hydroxide, calcium hydoxide, and lithium hydroxide. Most preferably, the inorganic base is a di- or tri-metal oxide, particularly lithium salts of weak acids. Preferably, the at least one other fluorinated monomer is hexafluoropropylene (HFP).

In another aspect, the invention provides a battery comprising a positive electrode element, a negative electrode element, and a separator/electolyte element disposed between the electrode elements. Preferably each of the elements comprises a polymeric material, with the polymeric material consisting of a copolymer of vinylidene fluoride (VdF), and at least one other fluorinated monomer (OFM) which is an ethylenically unsaturated monomer having at least as many fluorine atoms as carbon atoms, and having included therein a polyhydroxylic aromatic crosslinking agent for the copolymer; where on the basis of 100 parts of total monomeric units, said VdF constitutes at least 90 parts and said OFM constitutes the balance. In other words, the molar ratio of VdF:OFM is at least about 90:10. In this composition the oxygen of a first hydroxide group of the polyhydroxylic aromatic compound is bonded to a carbon of a first OFM unit (adjacent a first VdF-OFM bond), and a second oxygen of a second hydroxide group of said polyhydroxylic aromatic compound is bonded to a carbon of another OFM unit (adjacent a second VdF-OFM bond). The polyhydroxylic aromatic compound is present in an amount sufficient to provide at least one hydroxide group for every unit of OFM (HFP) in the copolymer. Preferably the polyhydroxylic aromatic is an aromatic dihydroxy compound; most preferably a bisphenol having two hydroxide groups and is present in an amount which provides one hydroxide group for every mole of OFM (HFP) in the copolymer. Therefore, the method and composition of the invention provide an elastomeric copolymer of vinylidene fluoride and at least one other fluorinated monomer, having improved stability in situ in an electrochemical cell as a result of the inclusion of the additional reagents for crosslinking.

It is desired that the fluoroelastomer of the invention contain at least 90 mole percent VdF monomeric unit and the balance the one or more other fluorinated (OFM) monomeric unit(s). In a desired embodiment, the elastomeric copolymer comprises VdF and OFM in a molar ratio of at least 90:10 of VdF:OFM; more desirably, at least 92:8 of VdF:OFM; preferably, at least 93:7 of VdF:OFM; most preferably at least 95:5 of VdF:OFM; and the composition may range as low as 3–4% OFM with the balance the VdF (96:4 to 97:3 of VdF:OFM). These and even higher VdF content are usable with the proper casting solvent, described herein below.

Among the most useful elastomeric copolymers are copolymers of vinylidene fluoride (VdF) and hexafluoropropylene (HFP), chlorotrifluoroethylene or pentafluoropropylene, and copolymers of vinylidene fluoride, tetrafluoroethylene and hexafluoropropylene or pentafluoropropylene. "Copolymer" herein means the product of copolymerizing two or more monomers. Especially preferred are vinylidene fluoride/hexafluoropropylene copolymers in which the monomers are combined in a molar ratio of at least about 90:10 of VdF:HFP. The copolymer can also be any other vinylidene fluoride copolymer fluoroelastomer which can be cured to useful products, for example copolymers of vinylidene fluoride with dichlorodifluoroethylene or chlorofluoroethylene, with fluorinated vinyl esters, with derivatives of perfluoroacrylic acid, and with fluorinated alkyl vinyl ethers; the latter can be illustrated by copolymers of vinylidene fluoride and a perfluoroalkyl perfluorovinyl ether as described in U.S. Pat. No. 3,136,745, and copolymers of vinylidene fluoride, tetrafluoroethylene and said ether as described in U.S. Pat. No. 3,235,537. Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106. The "other fluorinated monomer" (OFM) of the copolymer is desirably an ethylenically unsaturated monomer containing at least as many fluorine atoms as carbon atoms. The above are described in U.S. Pat. Nos. 3,876,654; 3,894,118; 4,200,568; 4,489,196; and 4,496,682; each of which is incorporated by reference herein in its entirety.

The crosslinking agent of the novel curable battery electrode and electrolyte composition can be selected from known polyhydroxylic aromatic compounds capable of functioning as a cross-linking agent for the elastomeric copolymer. For example, the cross-linking agent can be any one of the following: di-, tri-, and tetrahydroxybenzenes, naphthalenes, and anthracenes, and bisphenols of the formula shown in FIG. 4, wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxylic compound is optionally substituted with at least one atom of chlorine, florine, or bromine, a —CHO group, or a carboxyl or acyl radical (e.g., a —COR where R is OH or a $C_1C_8$, alkyl, aryl, or cycloalkyl group). It will be understood from the above bisphenol formula that the —OH groups can be attached in any position (other than number one) in either ring. Blends of two or more such compounds can also be used.

Referring to the bisphenol formula as per the previous paragraph, when A is alkylene, it can be for example methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene, and hexamethylene. When A is alkylidene, it can be for example ethylidene, dichloroethylidene, difluoroethylidene, propylidene, isopropylidene, trifluorisopropylidene, hexafluoroisopropylidene, butylidene, heptachlorobutylidene, heptafluorobutylidene, pentylidene, hexylidene, and 1,1-cyclohexylidene.

The constituent A is not limited and may include the examples recited above as well as A being a cycloalkylene radical or a arylene radical. Desirably, the cross-linking agent is an aromatic dihydroxy compound and preferably a bisphenol. The preferred bisphenol AF cross-linking agent is referred to in the art by various names. The correct IUPAC name is 4,4'(hexafluoropropane) diphenol. It is also referred to as hexafluoroisopropolidene-bis( 4-hydroxybenzene); and 2,2-bis(4-hydroxyphenyl) hexafluoropropane, Bp-AF.

It is preferred that the crosslinking agent be used with a vulcanization accelerator. A desired accelerator is an alkyl or aryl triarylphosphonium compound; and is used with a desirable crosslinking agent compound selected from the group: dihydroxy-, trihydroxy- and tetrahydroxy-benzenes, -naphthalenes and -anthracenes having an aromatic ring which bears an electron-withdrawing substituent, and bisphenols of the formula of FIG. 4, wherein A is an electron-withdrawing group, and n is 1 or 2.

In the highly desirable composition described in the previous paragraph, the electron-withdrawing group A of the bisphenol formula is preferably carbonyl, sulfinyl, sulfonyl, perfluorinated alkylene or perfluorinated alkylidene. The accelerator is preferably benzyl triphenyl phosphonium chloride or allyl triphenyl phosphonium chloride. The above are described in U.S. Pat. Nos. 3,876,654; 3,894,118; 4,200,568; 4,489,196; and 4,496,682; each of which is incorporated by reference herein in its entirety.

As mentioned above, desirable vulcanization accelerators are phosphonium compounds or ammonium compounds, more desirably phosphonium salts and preferably quaternary phosphonium salts or quaternary ammonium compound. In such quaternary salts, phosphorous may optionally be replaced by arsenic or antimony. The preferred quaternary phosphonium vulcanization accelerator is of the general formula as disclosed in U.S. Pat. No. 3,876,654, incorporated herein by reference, and shown herein in FIG. 5, wherein P is phosphorous; $R_1$, $R_2$, $R_3$, and $R_4$ are selected individually from the group; $C_1$–$C_{20}$ alkyl, aryl, aralkyl, alkenyl, and the chlorine, fluorine, bromine, cyano, —OR, and —COOR substituted analogs thereof, R being selected from the group: $C_1$–$C_{20}$ alkyl, aryl, aralkyl, and alkenyl; and X is selected from the group: halide, sulfate, sulfite, carbonate, pentachlorothio-phenolate, tetrafluoroborate, hexafluorosilicate, hexa-fluorophosphate, dimethyl phosphate, and $C_1$–$C_{20}$ alkyl-, aryl-, aralkyl-, and alkenyl-/-carboxylate and dicarboxylate: n is 1 or 2 and equal to the valence of the anion X, and are described and disclosed for this use in the Pattison patent. In the above formula X can also be —OAr or —OArOH, where Ar is an aryl radical. The ammonium compounds include those disclosed in Kometani et al, U.S. Pat. No. 3,864,298 and Patel et al, U.S. Pat. No. 3,655,727 as well as cyclic amidinium salts. The above are described in U.S. Pat. No. 3,876,654; 3,894,118; 4,200,568; 4,489,196; and 4,496,682; each of which is incorporated by reference herein in its entirety.

It is preferred that the crosslinking reagents include the inorganic base stated above. Desirably, the inorganic base is a basic metal oxide or hydroxide, and preferably selected from the group of aluminum oxide ($Al_2O_3$), sodium hydroxide, calcium hydroxide, and lithium hydroxide. Most preferably, the inorganic base is a di- or tri- (valent) metal oxide, particularly lithium salts of weak acids.

The invention provides substantial advantages over conventional methods of forming electrochemical cells due to the unique stabilized binder formulation of the present invention. Objects, features, and advantages of the invention include an improved electrochemical cell or battery based particularly on lithium, which has improved charging and discharging characteristics; and which maintains its integrity over a prolonged life cycle as compared to presently used cells. Another object is to provide stabilized electrochemical cells which are stabilized against decomposition of cell components, and particularly degradation of the binder included in electrode elements and electrolyte/separator elements.

These and other objects, features, and advantages will become apparent from the following description of the preferred embodiments, claims, and accompanying drawings.

DETAILED DESCRIPTION OF THE PREFERRED EMBODIMENTS

Figure 1:
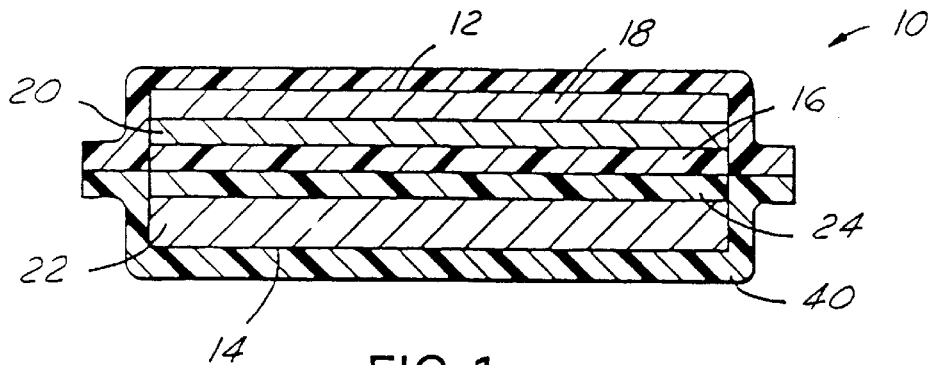
FIG. 1 is an illustration of a cross-section of a thin battery or cell embodying the invention.
Figure 2:
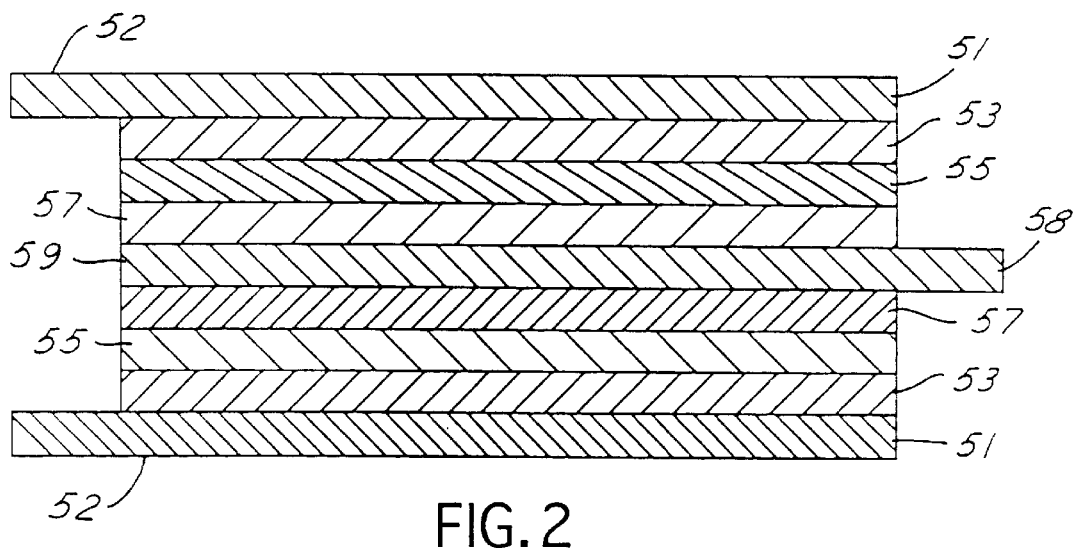
FIG. 2 is an illustration of a multicell structure for a battery embodying the invention.

The invention provides, for the first time, an understanding of the mechanisms by which certain electrochemical cell components are decomposed or undergo degradation. The invention also provides unique and effective compositions and methods for preventing such degradation, thus leading to stabilized electrochemical cells. Before describing the invention, it is useful to understand the present approach to forming such cells and the undesired degradation reactions which presently occur in cells presently formed by conventional methods.

Electrolytic cell electrode and separator elements utilizing polymeric materials comprise a combination of a copolymer matrix and a compatible organic solvent plasticizer which maintains a homogeneous composition in the form of a flexible, self-supporting film. A particularly favored copolymer is a combination of vinylidene fluoride (VdF) and hexafluoropropylene (HFP). Formulations presently used typically comprise 12–15 molar parts HFP, and the balance, 85–88 molar parts, the VdF.

Electrolytic cells, such as primary cells and particularly rechargeable secondary battery cells, are constructed by lamination of electrode and electrolyte cell elements which are individually prepared by coating, extrusion, or otherwise from compositions comprising the VdF:HFP copolymer. For example, in the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as $LiMn_2O_4$ (LMO), $LiCoO_2$, or $LiNiO_2$, powder in a copolymer matrix solution, which is dried to form the positive electrode. An electrolyte/separator membrane is formed as a dried coating of a composition comprising a solution containing VdF:HFP copolymer, and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

In conventional methods, the laminate structure comprises the organic plasticizer but does not yet contain any of the hygroscopic electrolyte salt. As a result, in this condition the cell is considered inactive and may be stored at ambient conditions without concern for electrolyte deterioration. In the final stages, the electrolyte salt solution is added during the final sealing operation in a protective atmosphere. When it is desired to so activate the battery in this final stage of manufacture, one of two procedures may be followed. In order to facilitate absorption of electrolyte solution, some or all of the plasticizer may be removed from the cell prior to adding the electrolyte solution.

In another variation, it is also possible to remove the plasticizer from any one of the film components after casting the film and before or after lamination. For example, if desired, it is possible to remove the plasticizer only from the electrolyte/separator. Films with retained high boiling point plasticizer solvent are referred to as "wet" form. Test films from which the plasticizer has been extracted represents a "dry" form of a membrane or film material. Obviously, some or all of the plasticizer may be removed from the electrode film, if desired, after casting. Therefore, extraction of the plasticizer can be accomplished any time following the casting of the films, and before or after lamination. Therefore, it is understood that the individual films or the laminate structure may be stored in either plasticized or extracted form for any period of time prior to activation. It is preferred to cast the electrode and electrolyte films, laminate them as described earlier, and then remove the plasticizer from the laminate. This usually is more efficient than making and storing individual films. Although a plasticized copolymer matrix will imbibe an electrolyte salt solution, displacing the plasticizer solvent, it is preferable to extract the plasticizer to facilitate absorption of fluid electrolyte by the films. Examples of casting, lamination and extraction alternatives are described in U.S. Pat. Nos. 5,418,091; 5,460,904; and 5,456,000, assigned to Bell Communications Research, each of which is incorporated by reference in its entirety, herein. The '091, '904, and '000 patents referenced and incorporated herein, describe film compositions containing VdF:HFP molar ratios of 85:15 and 88:12.

Batteries formed by the aforesaid processes have been recently analyzed, and it has been determined that the VdF:HFP copolymer binder is an important source of undesirable byproduct components evolved from the copolymer film composition during cell operation. This is in marked contrast to historical approaches where it was thought that impurities in electrochemical cells resulted in undesirable reactions, and that once a significant portion of impurities, such as water, were removed, the undesirable reactions would cease to occur. However, for the first time, it has now been discovered that the copolymer film composition itself is subject to degradation during cell operation, causing evolution of byproduct components which degrade cell performance, and which cause distortion of the cell itself. It has been determined that degradation of the polymer results in evolution of gaseous and acidic constituents, including HF. More specifically, it has recently been determined that the VdF:HFP copolymer is particularly reactive in the presence of lithiated graphite at elevated temperatures. This poses a problem, particularly in the case of an internal short or similar situation where the cell is heated to around the melting point of the copolymer, causing an increased reaction rate in the liquid state between the copolymer and the lithiated graphite.

Figure 3:
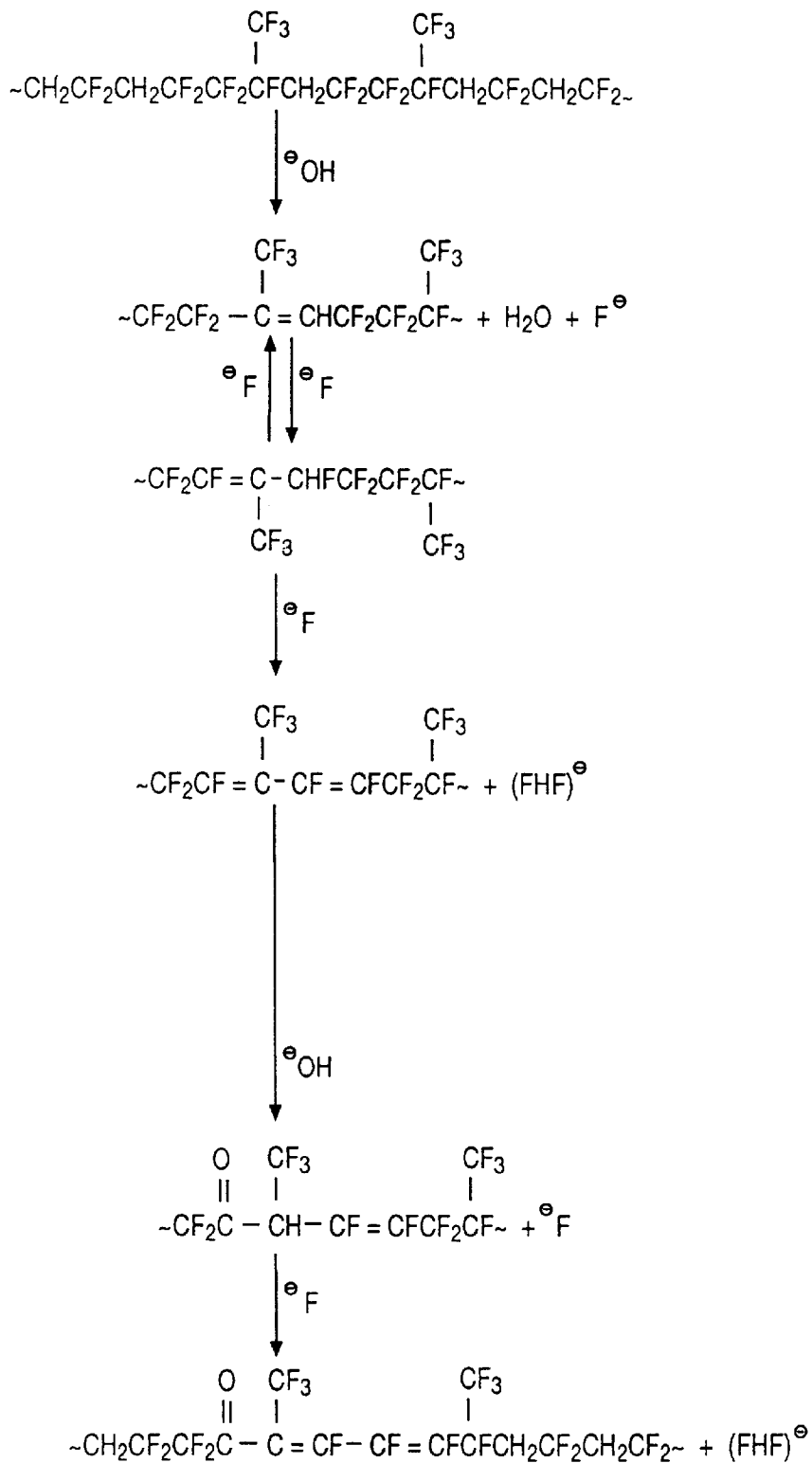
FIG. 3 is a schematic of a proposed reaction path for polymer degradation.

The VdF:HFP copolymer is also referred to in the literature as poly($VF_2$/HFP). It is thought that dehydrofluorination of poly($VF_2$/HFP) occurs in the presence of a base (eg. OH ion) producing what could be considered an active site. (FIG. 3: Conventional 3.5 $VF_2$/HFP (78:22 molar ratio) polymer, reactive site concentration 0.6 mole per Kg of polymer.) It appears that highly selective dehydrofluorination of isolated $VF_2$ units occurs in the HFP/$VF_2$/HFP structures. These sites appear to occur at the location of bonds between the VdF and HFP units of the polymer. (See Angew.Makromol.Chem., 76/77, 39(1979).) At each of these sites, there is a propensity to liberate two molecules of fluorine or two molecules of HF. In the proposed reaction path of the HFP/$VF_2$/HFP site, there appears to be attack by a base such as a hydroxide, followed by fluoride ion initiated re-arrangement of the initial double bond. The resulting allylic hydrogen is abstracted by fluoride, a relatively strong base in dipolar aprotic solvents as is present in an electrochemical cell. This is followed by elimination of a second fluoride. As a result, for each mole of VdF:HFP bonds, there is the possibility to produce two moles of HF acids from these reactive sites. Therefore, in the cell it is thought that the mechanism for degradation of the polymeric film involves release of fluoride or HF from the polymer film reacting with the graphite, and particularly lithiated graphite. Deactivation or blocking of the reactive site reactivity, or a reduction in the number of reactive sites in the polymer, would reduce or inhibit undesired reactivity in HF formation. The degradation mechanism is generalized to any copolymer vinylidene fluoride monomer (VdF) and at least one other fluorinated monomer (OFM).

In another aspect, the relatively low melting point of relatively high weight content HFP, conventional copolymer blends is thought to contribute to degradation. The polyvinylidene fluoride polymer has a melting point on the order of 165–170C (degrees centigrade). In contrast, the conventionally used VdF:HFP copolymer having 12–15% HFP and the balance VdF, has a lower melting point, on the order of 135 to 140C (degrees centigrade). The conventional copolymer, having the lower melting point, contains a greater number of VdF:HFP reactive sites and is obviously more reactive than polyvinylidene fluoride. In the range of 90 to 100 molar parts VdF (0–10 parts HFP) it is thought that the relationship between melting point and VdF or HFP content is about linear. In this same range, equivalent weight percentage of VdF changes by about two percentage points for each one mole change in VdF content. That is, about 95:5 mole ratio VdF:HFP corresponds to roughly about 89 weight percent VdF; 97:3 is about 93 weight percent VdF; 98:2 percent VdF; 97:3 is about 93 weight percent VdF; 98:2 mole ratio VdF:HFP is about 95 weight percent VdF; 93:7 is about 85 weight percent VdF; and 90:10 Vdf:HFP is about 79 weight percent VdF. These are rough approximations because the ratio of monomers is not directly convertible to weight content of monomeric units in the copolymer product, due to the varying arrangement of such units in the product. With its lower melting point, the conventional 88:15 VdF:HFP copolymer is thought to have greater reactivity with graphite and lithiated graphite since liquid state reactions mechanistically occur at a greater rate than the corresponding solid state reaction. The degradation mechanism is generalized to any copolymer vinylidene fluoride monomer (VdF) and at least one other fluorinated monomer (OFM).

The methods and compositions of the invention provide two solutions to reduce the reactivity of VdF-based copolymers to lithiated graphite. The two approaches can be used separately or combined. In one embodiment, the relative proportion of the VdF and the other fluorinated monomer (OFM, i.e. HFP) in the copolymer is significantly reduced below conventional formulations in order to reduce the reactivity of the copolymer. In a second approach, the reactivity of the copolymer, over a broad range of monomer VdF:OFM molar ratios, is reduced by deactivating the reactive sites on the copolymer, thereby blocking the ability to undergo undesired reaction during cell operation. These methods and compositions have heretofore not been proposed and are of primary importance in preventing large exothermic reaction which can lead to thermal runaway when conventional polymer formulations are utilized in batteries in the presence of reactive components such as lithiated graphite.

In one embodiment, mentioned briefly above, the invention comprises utilizing VdF:OFM copolymer which has a relatively reduced concentration of OFM and a relatively increased melting point, as compared to the typical 85:15 VdF:HFP present in current formulations of the copolymer. The VdF:OFM copolymer consists essentially of the vinylidene fluoride, with the other fluorinated monomer (OFM) present in the copolymer in a molar amount of less than 10 percent (VdF:OFM at least 90:10). It is desirable that the other monomer (OFM) be present in an amount of less than 9 percent (VdF:OFM at least 91:9), more desirably OFM less than 8 percent (VdF:OFM at least 92:8), most desirably less than 7 percent (VdF:OFM of at least 93:7), preferably OFM less than 6 percent (VdF:OFM at least 94:6), more preferably less than 5 percent (VdF:OFM of at least 95:5), and most preferably 3–4 percent (VdF:OFM of about 96:4 to 97:3). Conventional thinking in the past has been that this copolymer must constitute at least 12–15 mole percent HFP, otherwise the coating solutions become unmanageable due to the relative unsolubility of copolymer containing the lower HFP concentration, leading to undesirable crystallinity of the composition, based on use of tetrahydrofuran (THF) casting solvent. Such preferred 88:12 and 85:15 VdF:HFP compositions are sold under the registered trademark Kynar Flex copolymer, available commercially from Atochem North America. The 88:12 molar ratio is designated as Flex 2801 and the 85:15 molar ratio is designated as Flex 2750. (See U.S. Pat. No. 5,418,091 previously incorporated herein by reference in its entirety.)

In spite of assertions to the contrary in the conventional art, it has been found that it is possible to dissolve VdF:OFM copolymers having a relatively low proportion of OFM in solvents selected from the group consisting of 1-methyl-2-pyrrolidinone, dimethyl acetamide, dimethyl carbonate, triethyl phosphate, dimethyl sulfoxide, acetone, dimethyl formamide, and 2-butanone. It has been found that these solvents have the capability to dissolve the polymer at room temperature. Elevating the temperature of the solution permits the use of other solvents. It may also permit use of VdF:OFM of less than 97:3 and as low as 98:2 or 99:1, or even where OFM is present in any small amount, being greater than zero.

The relatively low amount of the other fluorinated monomer (OFM) in the VdF:OFM copolymer still permits effective function as a binder with typical positive electrodes, negative electrodes and electrolyte/separator films. Correspondingly, these are high content VdF copolymers. There is a relatively broad range of electrode and electrolyte separator compositions with which the low content exemplary HFP copolymer binder is utilized. The relative weight proportions of the components of the positive electrode are generally: 50–90% by weight active material; 5–30% carbon black as the electric conductive diluent; and 3–20% binder of the invention chosen to hold all active materials in contact with one another without degrading ionic conductivity. Stated ranges are not critical and the amount of active material in an electrode and may range from 25–85 weight percent. The negative electrode comprises about 70–95% by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion.

The plasticizing solvent used with the invention is not critical and may be one of the various organic compounds commonly used as solvents for electrolyte salts; for example, propylene carbonate, ethylene carbonate, higher-boiling plasticizer compounds such as dibutyl phthalate, dimethyl phthalate, and diethyl phthalate. Inorganic filler additives such as fumed alumina or silanized fumed silica, may be used to enhance the physical strength and melt viscosity of a separator membrane, and in some compositions to increase the level of electrolyte solution absorption. Those skilled in the art will understand that any number of methods may be used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160C Subsequent to lamination, the battery cell material may be stored either with the retained plasticizer or as a dry sheet after extraction of the plasticizer with a selective low-boiling point solvent. The plasticizer extraction solvent is not critical and methanol or ether may be used. It is also possible to accomplish extraction under vacuum at less than or equal to 2 mm of mercury while heating to 90–150C It is preferred that if methanol extraction is used, the cells are dried for 1–5 hours in a vacuum oven at 45–150C, and in a vacuum. The aforesaid methods are suitable for forming electrodes and electrolyte separator films when using the high concentration VdF copolymers of the present invention.

In another embodiment of the invention, a method is provided for forming electrode and separator elements having a polymeric composition which includes a cross-linking agent reactive with the active sites to inhibit or at least diminish the occurrence of dehydrofluorination at the active site, aforesaid juncture of HFP-VF$_2$-HFP (OFM-VF$_2$-OFM) linkages. This naturally occurs when the aforesaid copolymers are formed where a carbon bearing the fluorine is attached next to a carbon bearing hydrogen, where there is a propensity to strip of f HF and cause a double bond, which is where crosslinking may occur.

The polymeric material of the invention is unique because it further includes a crosslinking agent which is a polyhydroxylic, aromatic compound. Thus, the polymeric binder of the invention comprises a vinylidene fluoride-hexafluoropropolyene polymer having included therein the polyhydroxylic aromatic compound bonded to the VdF:HFP (VdF:OFM) polymer. It is thought that the oxygen of a hydroxylic group of the aromatic bonds to a carbon of the HFP (or OFM) monomeric unit adjacent the HFP-VdF (OFM-VdF) bond. Another carbon of another HFP (OFM) group bonds to a second oxygen of a second hydroxylic group of the aromatic. The pattern of crosslinking will depend on the concentration of HFP (OFM) in the polymer. The repetition length of the polymer likewise depends on the concentration of HFP (OFM). Thus, the crosslinking agent may be used in combination with relatively low concentrations of HFP in the copolymer to achieve an added benefit.

Methods of crosslinking and crosslinking agents will now be described, with particular emphasis on preferred methods, compositions, and reagents. The crosslinking reagents include a crosslinking compound, and preferably an accelerator and a basic compound. The basic compound assists the mechanism of crosslinking. The accelerator is optional but preferred. The crosslinking compound is desirably a polyhydroxylic-aromatic compound, preferably an aromatic dihydroxy compound, most preferably a bisphenol of the formula of FIG. 4. The basic compound is desirably an inorganic base, and preferably a metal oxide or hydroxide. The accelerator is desirably an ammonium or phosphonium salt and preferably a phosphonium chloride salt. Preferably it is a phosphonium accelerator; and most preferably a quaternary phosphonium compound. See FIG. 5.

Advantageously, the crosslinking methods and reagents of the invention are highly flexible and compatible with conventional methods for preparing and casting the electrolyte/separator (separator) and electrode films. Recall that in conventional methods a number of variations are presently used. In one alternative, a solution comprising polymer and plasticizer is formed. A preferred plasticizer is dibutyl phthalate (DBP). Then, the separator is cast and the plasticizer is removed. The positive electrode and negative electrode are also cast from solution incorporating active materials and the same polymer binder and plasticizer as used for the separator, and the plasticizer is optionally removed. The three cast films are laminated together. In a second alternative, the separator and positive and negative electrode films are cast, then laminated together, then the plasticizer is extracted from the laminated assembly. In a third alternative, steps similar to the second alternative are followed, except that the plasticizer is extracted any time before activation of the cell, and cells are stored after lamination with the plasticizer present. The plasticizer is removed just before the electrolyte solution is added to the cell to activate the cell. The crosslinking methods, compositions and reagents of the invention are compatible with these conventional techniques, although a preferred technique will be described later below. In any of the above conventionally used alternatives for forming cells, it is possible to add crosslinking reagents to the casting solution. Then, after casting and before activation, anneal the films at a temperature in a range of 100–150C for about one to about eight hours to accomplish crosslinking. The plasticizer, impurities such as water, and any unreacted crosslinking reagents are preferably removed. The films are laminated and then the cell is packaged and activated.

As can be seen, it is possible to include the crosslinking reagents in the initial casting solution, and then anneal to crosslink any time after casting the films. It is preferred to anneal after the electrode and separator films have been laminated together. In this procedure, crosslinking reagents are added to traditional electrolyte/separator and electrode formulations in proper concentrations and cast into films. The films are then laminated into electrodes and separators, and then into cells following standard conventional procedures. The cells are then annealed at 100–150C for 1–8 hours, and followed by applying a vacuum to remove plasticizer, unreacted reagents, and undesired impurities such as water from the cell. Then the cells are activated and packaged following conventional procedures as outlined above, and described in U.S. Pat. Nos. 5,418,091; 5,456,000; and 5,460,904, as previously incorporated herein by reference in their entirety. As will be evident from the above, lamination of cell components and removal of plasticizer may each occur any time after casting of the film. Furthermore, lamination of the films and removal of the plasticizer may occur anytime before or after crosslinking.

In a preferred method, the electrolyte/separator (separator) and electrode compositions are each prepared using the preferred VdF:HFP binder and the crosslinking agent of the invention. However, other copolymers of VdF and at least one other fluorinated monomer (OFM) may be used. Here the VdF/HFP is exemplary. The separator composition contains the VdF:HFP polymer and the plasticizer. The electrode compositions each comprise the active material, an optional conductive diluent, the VdF:HFP polymer and the plasticizer. The crosslinking agent is preferably not included at this stage. The separator and electrodes are cast using a conventional casting solvent such as THF. The films are then laminated. Next, the plasticizer is extracted using either a solvent or heat and vacuum. If solvent extraction is used, the cell is subsequently dried under vacuum. It is preferred to used an extraction solvent such as methanol and record the weight uptake of methanol for the extracted cell. Then, a crosslinking solution is added to the cell in vapor-proof packaging. The amount of crosslinking solution added is based on the known weight of polymer and the weight of absorbed methanol. Next, the cell is allowed to dry to permit any methanol to evaporate before the crosslinking reaction occurs. The cell is then heated for about one hour to about eight hours at a preferred temperature of about 150C to cause crosslinking. Preferably, any unreacted crosslinking reagents are then removed from the cell. The cells are stored, or immediately activated by adding the electrolyte salt solution.

EXAMPLE

Typical formulations for casting separator and electrode films are given in Table 1. The following is an exemplary method for preparing cells, including bicells having conventional design of anode/separator/cathode/separator/anode. Appropriate casting solutions are formed for the respective films of compositions given in Table 1. Casting solutions for the separator, anode and cathode, as given in Table 1, include a preferred inorganic base, $Al_{23}$. The first step comprises casting the films and laminating the films into electrode separator assembly using metal foil or expanded metal grids as current collectors, and then stacking and laminating electrodes into the anode/separator/cathode/separator/anode bicell design. Next, the plasticizer is extracted from laminated cells using either an extraction solvent such as methanol or ether, or by using heat in a range of 90–150C and vacuum at, or less than, 2 mm mercury. If methanol extraction is used, it is preferred to dry the cells for one to five hours in a vacuum at a temperature of 45–150C Next, record the weight uptake of methanol in the extracted cell, and using known weight of absorbed methanol and known weight of polymer in the cell, formulate a cross-linking solution of 2,2-bis(4-hydroxyphenyl) hexafluoropropane), BPAF and bis(triphenyl) phosphonium chloride), BTPPC, such that the concentration of each in the weight of absorbed weight of methanol is equal to: two parts BPAF per 100 parts polymer, and 0.02 parts BTPPC per 100 parts polymer in the cell. Preferably a small weight fraction on the order of less than or equal to 10 weight percent of acetone can be added to assist in swelling the polymer slightly to allow the crosslinking agents to completely disperse throughout the cell. Next, the crosslinking solution is added to the cell from which the plasticizer has been extracted, and which has been permitted to dry. At this stage it is preferred that the cell components be disposed in a sealable vapor-proof package.

The cell is allowed to absorb the crosslinking solution for at least one hour. Then the package is opened slightly to permit methanol to evaporate slowly, leaving behind the crosslinking agents inside the cell in the desired concentrations. The cells are then placed in an oven for crosslinking reaction (annealing) at a preferred temperature of about 150C for about 1–8 hours. After crosslinking, another methanol extraction or vacuum extraction is preferably used to remove any unreacted materials. Then the cells are activated with electrolyte salt solution as is conventional practice.

Figure 4:
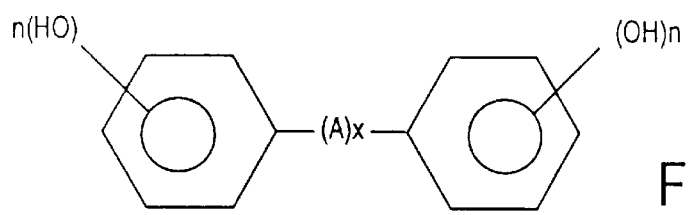
FIG. 4 shows a general structure for bisphenols.
Figure 5:
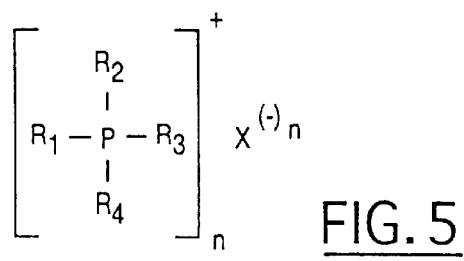
FIG. 5 shows a general structure for quaternary phosphonium compounds.

In summary, the essential crosslinking agent is the polyhydroxylic aromatic compound, desirably a hydroxybenzene, or bisphenol as shown in FIG. 4. A preferred crosslinking agent is Bisphenol AF; 4,4' (hexafluoropropane) diphenol. It is preferred that an accelerator also be used. A desirable accelerator is selected from quaternary phosphonium compounds and quaternary ammonium compounds. A preferred accelerator is a benzyl triphenyl phosphonium chloride (or other halogen), and most preferably is bis (triphenyl) phosphonium chloride. It is preferred that the crosslinking reagents include the inorganic base stated above. Desirably, the inorganic base is a basic metal oxide or hydroxide, and preferably selected from the group of aluminum oxide ($Al_{23}$), sodium hydroxide, calcium hydroxide, and lithium hydroxide. Most preferably the inorganic base is a di- or tri- (valent) metal oxide, particularly lithium salts of weak acids. The process of the invention forms a curable polymeric composition which is cured by annealing, as described above, to cause crosslinking. Vulcanization is synonymous with crosslinking in the elastomer field.

Although a preferred embodiment is described with reference to removing unreacted crosslinking reagents, advantageously, it is not necessary to remove such unreacted reagents. It is essential that the crosslinking reagents, and preferably the bisphenol, be present in an amount sufficient to provide one molecular unit of the preferred bisphenol for each two (VdF:OFM) HFP:VdF juncture reactive bond sites.

A variety of crosslinking agents, crosslinking accelerators, and inorganic basic compounds may be used in addition to the preferred compounds noted above. Crosslinking agents, accelerators, and inorganic bases suitable for the VdF-based polymer crosslinking are also described in U.S. Pat. No. 3,876,654; 3,894,118; 4,200,568; 4,489,196; and 4,496,682; each of which is incorporated by reference in its entirety.

TABLE I

TYPICAL FORMULATIONS FOR CASTING ELECTROCHEMICAL CELL BATTERY FILMS

| Constituent | Mass |
|---|---|
| SEPARATOR | |
| Fumed Silica | 4.8 |
| Polymer | 8.9 |
| Plasticizer | 16.35 |
| $Al_2O_3$* | 1.1 |
| Solvent | 73.4 |
| ANODE | |
| Graphite | 34.48 |
| Conductive Carbon | 2.47 |
| Polymer | 5.43 |
| Plasticizer | 8.24 |
| $Al_2O_3$* | 1.1 |
| Solvent | 49.38 |
| CATHODE | |
| LMO | 34.64 |
| Conductive Carbon | 2.68 |
| Polymer | 4.01 |
| Plasticizer | 10.5 |
| $Al_2O_3$* | 1.1 |
| Solvent | 54.0 |

*This inorganic base is included along with crosslinking additives with the polymer when including such crosslinking additives in the initial casting formulation.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A battery comprising a positive electrode element, a negative electrode element, and a separator membrane element disposed between said electrode elements, at least one of said electrode elements comprising a polymeric binder intermingled with an active material, said polymeric binder comprising a copolymer of vinylidene fluoride, at least one other fluorinated monomer, and cross-linking agent for said copolymer, wherein said at least one other fluorinated monomer is an ethylenically unsaturated monomer having at least as many fluoride atoms as carbon atoms, and said cross-linking agent is a polyhydroxylic aromatic cross-linking agent for said copolymer, and wherein the molar ratio of said vinylidene fluoride to said other fluorinated monomer is at least 90:10; and wherein said element exhibits increased resistance to degradation, said degradation due, at least in part, to selective dehydroflorination of vinylidine fluoride units in said copolymer.

2. The battery according to claim 1, wherein said polyhydroxylic aromatic cross-linking agent is present in an amount sufficient to provide at least one hydroxide group for every unit of said other fluorinated monomer in the copolymer.

3. The battery according to claim 1, wherein said polyhydroxylic aromatic cross-linking agent is a bisphenol having two hydroxide groups and is present in an amount which provides one hydroxide group for every mole of said other fluorinated monomer in the copolymer.

4. The battery according to claim 1, wherein the molar ratio of said vinylidene fluoride to said other fluorinated monomer is at least 92:8.

5. The battery according to claim 4, wherein the molar ratio of said vinylidene fluoride to said other fluorinated monomer is at least 93:7.

6. The battery according to claim 4, wherein the molar ratio of said vinylidene fluoride to said other fluorinated monomer is at least 95:5.

7. The battery according to claim 4, wherein the molar ratio of said vinylidene fluoride to said other fluorinated monomer is between about 96:4 and about 97:3.

8. The battery according to claim 1, wherein oxygen of a hydroxide group of said polyhydroxylic aromatic cross-linking agent is bonded to a carbon of said other fluorinated monomers unit adjacent a vinylidine fluoride/other fluorinated monomer bond.

9. The battery according to claim 1, wherein oxygen of a first hydroxide group of said polyhydroxylic aromatic cross-linking agent is bonded to a carbon of a first said other fluorinated monomer unit adjacent a first vinylidine fluoride/other fluorinated monomer bond, and a second oxygen of a second hydroxide group of said polyhydroxylic aromatic cross-linking agent is bonded to a carbon of another of said other fluorinated monomer units adjacent a second vinylidine fluoride/other fluorinated monomer bond.

10. A battery cell assembly comprising a positive electrode, a negative electrode, and a separator membrane disposed therebetween, said membrane comprising a polymeric material consisting of a copolymer of vinylidene fluoride monomer and hexatluoropropylene monomer, wherein the molar ratio of said vinylidene fluoride to said hexafluoro-propylene monomer is at least 93.7, and wherein said separator membrane exhibits increased resistance to degradation, said degradation due, at least in part, to selective dehydroflorination of vinylidine fluoride units in said copolymer.

11. The battery according to claim 10, wherein the molar ratio of said vinylidene fluoride to said hexafluoropropylene monomer is at least 95:5.

12. The battery according to claim 10 wherein the molar ratio of said vinylidene fluoride to said hexafluoropropylene is between about 96:4 and about 97:3.

13. A battery comprising a positive electrode element, a negative electrode element, and a separator membrane element disposed between said electrode elements, said separator membrane element comprising a copolymer of vinylidene fluoride, at least one other fluorinated monomer and a cross-linking agent for said copolymer; wherein said at least one other fluorinated monomer is an ethylenically unsaturated monomer having at least as many fluorine atoms as carbon atoms, and said cross-linking agent is a polyhydroxylic aromatic cross-linking agent for said copolymer, and wherein the molar ratio of said vinylidene fluoride to said other fluorinated monomer is at least 90:10; and wherein separator membrane element exhibits increased resistance to degradation, said degradation due, at least in part to selective dehydroflorination of vinylidine fluoride units in said copolymer.

14. The battery according to claim 13, wherein said polyhydroxylic aromatic cross-linking agent is present in an amount sufficient to provide at least one hydroxide group for every unit of other fluorinated monomer in the copolymer.

15. The battery according to claim 13, wherein said polyhydroxylic aromatic cross-linking agent is a bisphenol having one hydroxide groups and is present in an amount which provides one hydroxide group for every mole of other fluorinated monomer in the copolymer.

16. The battery according to claim 13, wherein the molar ratio of said vinylidene fluoride to said other fluorinated monomer is at least about 92:8.

17. The battery according to claim 16, wherein the molar ratio of said vinylidine fluoride to said other fluorinated monomer is at least about 93:7.

18. The battery according to claim 16, wherein the molar ratio of said vinylidine fluoride to said other fluorinated monomer is at least about 95:5.

19. The battery according to claim 16, wherein the molar ratio of said vinylidine fluoride to said other fluorinated monomer is between about 96:4 and about 97:3.

20. The battery according to claim 13, wherein oxygen of a hydroxide group of said polyhydroxylic aromatic cross-linking, agent is bonded to a carbon of said other fluorinated monomer unit adjacent a vinylidine fluoride/other fluorinated monomer bond.

21. The battery according to claim 20, wherein oxygen of a first hydroxide group of said polyhydroxylic aromatic cross-linking agent is bonded to a carbon of a first said other fluorinated monomer unit adjacent a first vinylidine fluoride/other fluorinated monomer bond, and a second oxygen of a second hydroxide group of said polyhydroxylic aromatic cross-linking agent is bonded to a carbon of another of said other fluorinated monomer units adjacent a second vinylidene fluoride/other fluorinated monomer bond.

* * * * *